A. E. WING.
Upsetting Tires.

No. 62,384. Patented Feb. 26, 1867.

Witnesses:
Jo. C. Clayton
F. G. Clayton

Inventor:
Albert E. Wing

United States Patent Office.

ALBERT E. WING, OF BATTLE CREEK, MICHIGAN.

*Letters Patent No. 62,384, dated February 26, 1867.*

---

IMPROVED MACHINE FOR SHRINKING TIRE.

---

*The Schedule referred to in these Letters Patent and making part of the same.*

---

TO ALL WHOM IT MAY CONCERN:

Be it known that I, ALBERT E. WING, of Battle Creek, in the county of Calhoun, and in the State of Michigan, have invented a certain new and useful "Improved Machine for Upsetting Tires;" and I do hereby declare that the following is a full, clear, and exact description thereof, reference being had to the accompanying drawings, and to the letters of reference marked thereon, in which—

The nature of my invention consists in the use of levers so combined and arranged that they will firmly hold the tire in a required position, while by means of another lever the sliding head is pushed up, thus compressing or "upsetting the tire," as will be more fully hereinafter described.

To enable others skilled in the art to make and use my invention, I will proceed to describe its construction and operation.

Figure 1:
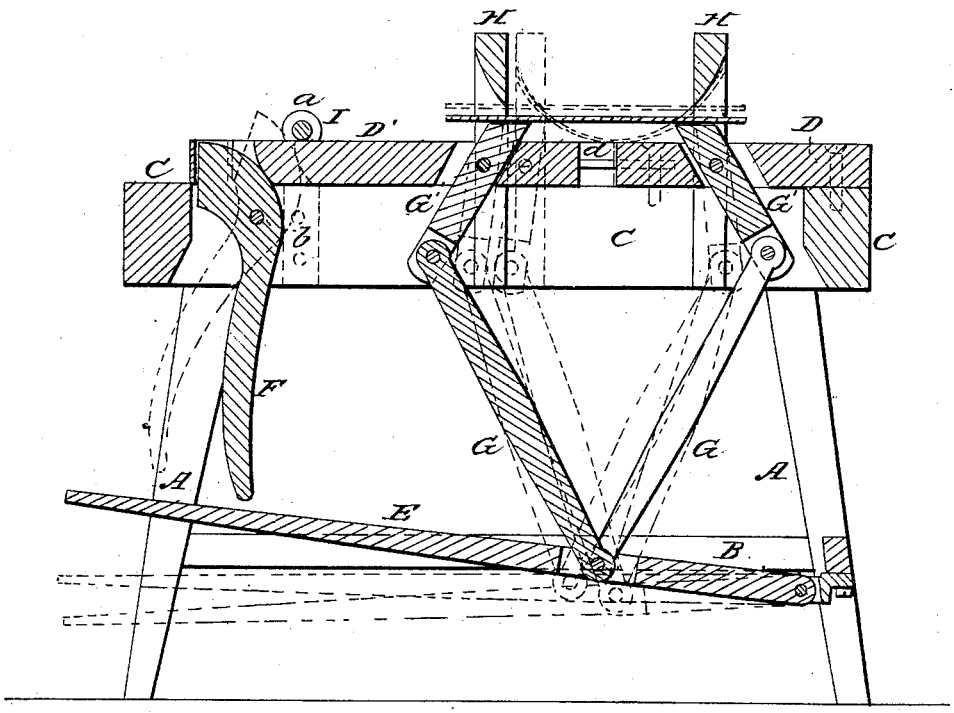
Figure 1 is a side elevation in section, showing the machine in position to be used. The different positions of the machine when in use are shown in red and yellow lines.
Figure 2:
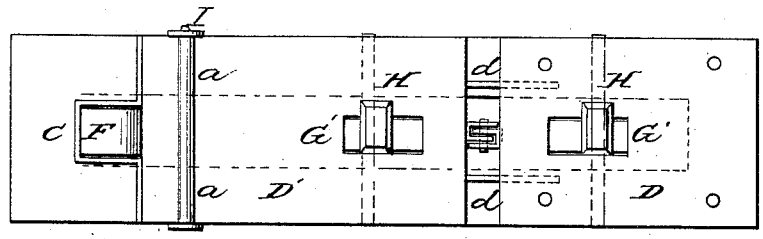
Figure 2 is a plan view of the same.

In the construction of my invention, in fig. 1, A the legs, on which the machine stands; B the side brace for supporting the legs; C the body of the machine, which is composed of an oblong frame, between the sides of which frame the levers are attached and operate; D a stationary block firmly attached to the frame C, and through which one of the biting-levers, G', projects, and through which projects one of the stationary jaws, H, which, in connection with the biting-lever, acts as a vise for holding the tire. D' is the sliding head, with a similar biting-lever and jaw for the same purpose, and which are attached to the same, and move parallel to the frame, as required. I attach straps, one on each side of the frame C, into which a roller, a, is let, as seen in fig. 2, for keeping in place the sliding head D' as it is operated. E the lever, operated by the foot, attached to the frame in the rear as its fulcrum, and also to the jointed biting-levers G and G'. F the hand-lever for moving the sliding head D'. This lever is attached to the frame C by a pivot, b, fig. 1, and which is connected to the sliding head by a band, c, in fig. 2. $d\,d$, in figs. 1 and 2, are pins attached to sliding head D', and which slide in holes in stationary block D, for keeping the sliding head in proper position while moving back and forward in its operation when in use. The lower edges of the stationary jaws H and the upper edge of the biting-levers G' are cut obliquely across, so as to form a sharp edge at the sides where they grasp the tire, which gives them a biting hold of the tire, and which will not allow it to slip. The upper and inner face of the hand-lever F is rounded, and is of a cam shape, so that by its movement it will push forward the sliding head.

In the operation of my machine, which is, as stated, for "upsetting tire," the tire when welded is often found to be too large. It then becomes necessary to shorten it. This is called "upsetting." I take the tire, (heated) as seen in fig. 1, (in yellow lines) curved, and place it between the jaws and biting-levers. I then press with the foot the lever E, which draws the upper ends of the biting-levers back and firmly grasps the tire between the said levers and jaws, holding the same firmly so that the tire cannot slip. I then press on lever F, which moves up the sliding head D', thus compressing the heated tire until I have thus sufficiently upset it, when the levers are pressed back to their original position and the tire removed, and the faces of the sides are dressed, as usual, and the tire is ready to apply to the wheel.

It will thus be seen that I make a very cheap and efficient machine, which is within the reach of all blacksmiths, which is greatly needed in that line of mechanical business.

Having thus fully described the construction and operation of my invention, what I claim as new, and desire to secure by Letters Patent, is—

1. I claim the jaws H H, biting-levers G' G', levers G G, foot-lever E, constructed and operating as described and for the purposes set forth.

2. I claim the stationary block D, sliding block D', and hand-lever F, constructed and operating as described and for the purposes set forth.

3. I claim the frame C and blocks D and D', in combination with the jaws H H, levers G' G', foot-lever E, and hand-lever F, the whole constructed and operating as set forth and for the purposes described.

In testimony that I claim the above-described invention, I have hereunto signed my name this 2d day of February, 1867.

ALBERT E. WING.

Witnesses:
T. G. CLAYTON,
JO. C. CLAYTON.